May 29, 1945.                    J. C. LANG                    2,377,086
                          FASTENING PIN OR THE LIKE
                            Filed July 7, 1943
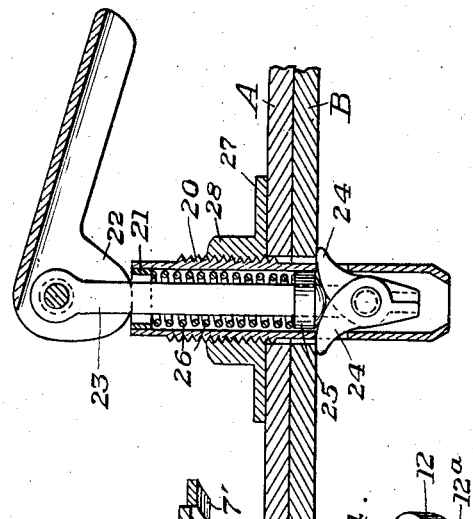
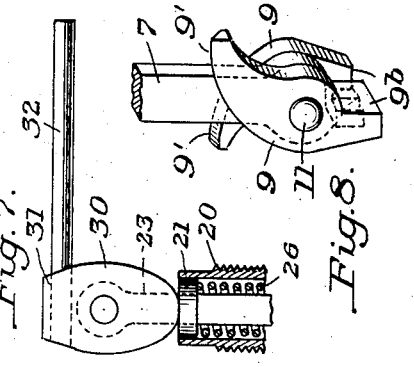
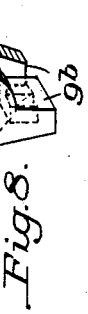
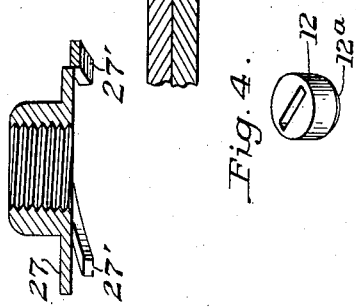
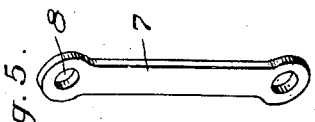
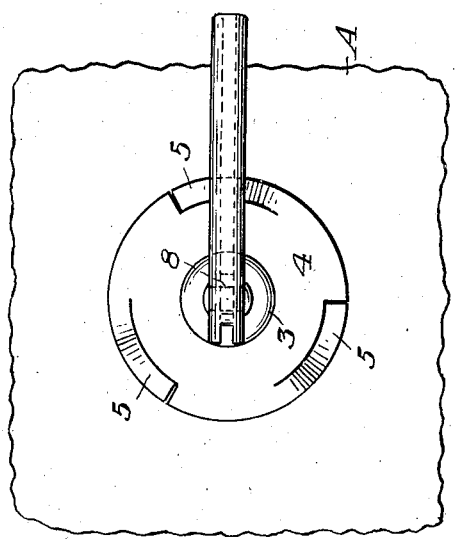
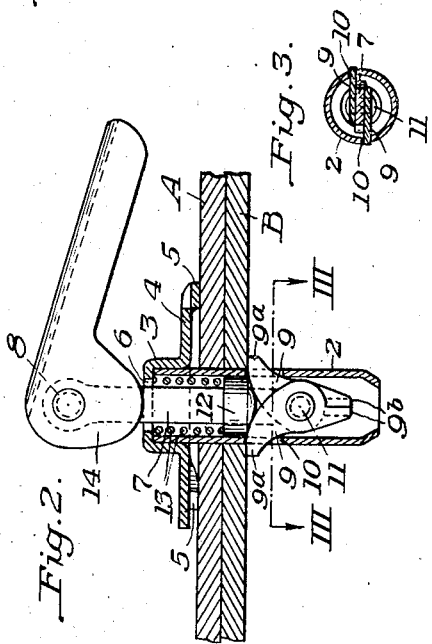
INVENTOR
Joseph C. Lang
by his attorneys Patented May 29, 1945

2,377,086

UNITED STATES PATENT OFFICE 2,377,086

FASTENING PIN OR THE LIKE

Joseph C. Lang, Pittsburgh, Pa., assignor to Bocjl Corporation, Pittsburgh, Pa., a corporation of Delaware Application July 7, 1943, Serial No. 493,738

12 Claims. (Cl. 85—3)

This invention is for a fastening pin of the type used for temporarily or detachably holding perforated metal or other parts together, or for a like structure.

In the assembly of various structures from metal sheets, plates and structural members it is commonly the practice to temporarily secure the parts to be joined by fastening pins or bolts which pass through registering holes therein, until a permanent fastening, such as riveting or welding can be effected. Also, in various knockdown or temporary constructions, fasteners are desired which can be very readily and quickly applied in erecting the structure and removed with equal facility when the structure is to be dismantled.

The present invention provides a fastener applicable for these and other purposes and has for its object to provide a fastener which is of simple, relatively cheap, dugged construction which can be easily operated and which will exert a pressure to yieldingly hold the connected parts in close face-to-face contact. My invention provides a fastening pin which, while applicable to use in fields where light or heavy structures are involved, is especially applicable to use in medium weight constructions where satisfactory pins of this character are not commercially available.

While designed primarily as a fastening pin, the structure may also be adopted for use in removing the burr on the inner face of a drilled opening.

My invention may be more fully understood by reference to the accompanying drawing in which:

Figure 1 is a top plan view of a locking pin embodying my invention, it being shown applied to objects to be fastened together.

Figure 2 is a longitudinal vertical section through Figure 1, part of the locking pin, however, being shown in elevation.

Figure 3 is a transverse section in the plane of line of 3—3 Figure 2.

Figure 4 is a perspective view of an abutment element housed within the locking pin.

Figure 5 is a perspective view of the operating stem or connection within the pin.

Figure 6 is a view generally similar to Figure 2, showing a slightly modified construction.

Figure 7 is a fragmentary view showing partly in side elevation, and partly in section, a still further modification in which the operating stem or handle of the cam is removable.

Figure 8 is a detail view in which the pawls have sharpened edges useful in removing the burrs on the inner face of drilled holes.

Fig. 9 is a vertical section through a modified form of flanged nut for use in the arrangement shown in Fig. 6.

In the drawing, 2 designates a sleeve or ferrule which constitutes the body of the fastening pin and which passes through registering holes in the two plates or other members to be joined, designated A and B. The sleeve is provided with a cap 3 that carries a flange 4 having resilient fingers 5 thereon. This cap may be brazed to the sleeve, and has a slot 6 in the top thereof.

Housed within the sleeve is an expander assembly comprising a rod 7, preferably stamped from sheet metal, and one end of this rod passes through the slot 6 in the cap and has an eye 8 at its projecting end. Pivotally carried on the inner end of the sleeve are two pawls or latch elements 9 having their upper ends 9a in position to be projected through apertures 10 in the sleeve. One of these pawls is on each side of the stem or rod 7. The tail ends of the pawls have reversely turned lugs 9b that contact each other, as shown in Fig. 2 when the pawls or latches are fully projected. The pivot pin for the pawls is designated 11.

On the stem 7 above the pawls 9 is a collar 12 through which the stem 7 is slidable, and which has a conical or spherical face 12a that bears against the curved top edges of the pawls. A compression spring 13 in the sleeve is confined between the cap and the collar.

An eccentric cam 14 is pivoted to the eye 8 of the stem and bears against the cap 3. It has an operating extension, which, as shown in Figs. 1 and 2 is integral with the cam, but, as hereinafter described may be removable.

In operation, the eccentric is initially in a position where its "low" part engages the cap. In this position, the free ends of the pawls are in the sleeve adjacent the apertures 10. The pin may be thrust through the holes in the parts A and B. Then the cam is rotated to an over center position, exerting tension on the stem 7, pulling the lower end upwardly. The tips of the pawls, assisted by the spherical surface 12a are forced out through the apertures 10 against the face of the member B. The pressure on the collar compresses the spring 13. At the same time the cam pushes inwardly on the pin, urging the flange 4 against the outer plate A, tending to compress the resilient fingers 5. The purpose of the fingers 5 is to enable the fastening pin to take care of slight variations in thickness of the plates A and B.

The pin thus provides a fastening device which can be quickly inserted in the registering holes in the objects to be joined and which will exert a pressure tending to press the parts together. It may be readily removed simply by turning the cam to retract the holding fingers or pawls.

In some instances it may be desirable to have a single pin accommodate itself to use with a wider variation of plate thicknesses than is obtainable by the use of spring fingers 5 on the flange 4. A modification is shown in Fig. 6 that lends itself to use with plates or objects of varying thickness. This form is much like the one already described except that the bearing flange, corresponding to 4 of Fig. 1 may be adjusted up or down on the pin.

In this modification, 20 designates the sleeve or pin, having its upper end closed by a disk 21 sweated or soldered into the end of the sleeve and which provides a bearing surface for the cam 22 on the stem 23. This stem passes down through the sleeve, and has the two pawls or locking fingers 24 thereon, these pawls being moved similarly to the ones in the structure first described. There is an internal collar 25 and a compression spring 26. Threaded on the outside of the sleeve 20 is a disk 27 having a knurled hub 28 by means of which it may be turned. Except for the disk being threaded on the pin the construction is the same as the one first described.

It will be immediately apparent that by adjusting the disk up or down along the pin the pin can be adjusted for use in clamping plates of different thicknesses. While the disk 27 might have spring fingers similar to fingers 5, this is not necessary because the threading of the disk allows adjustment to be made for variation in thickness. However, in some cases the spring fingers of Figs. 1 and 2 may be used to advantage on the threaded disk form shown in the Fig. 6. This is shown in Fig. 9 wherein the flange 27 is provided with spring fingers 27' similar to the portions 5 shown in Figs. 1 and 2.

In some instances it may be desirable to leave the fastener in place over a considerable period of time and in circumstances where unauthorized persons might attempt to operate the cams and remove the fastening pins. In order to render this more difficult, the cams may be made as shown in Fig. 7. In this case the over center cam, designated 30, instead of having an integral handle, has a socket 31 into which a removable handle 32 may be inserted. After the fastener has been set, the removable handle 32 can be withdrawn, and without a suitable counterpart it is difficult for one to molest the fastener. It will be apparent that where greater safety is required, a more intricate type of removable handle may be used.

From the foregoing, it will be seen that my invention provides a simple, convenient cheap form of easily operated fastening pin. As previously pointed out it is at present contemplated that its chief field of usefulness will be for structures of intermediate sizes in which present types of fasteners for thin light sheets are inapplicable, and where the structures are not so heavy as to require threaded bolts even for temporary fastening. The fastener has a distinct advantage over most fasteners intended for like use in that the pawls are positively held in expanded position by the over center cam and no amount of pressure tending to separate elements A and B will tend to retract them, and the compression spring functions only in retracting the pawls, whereas in many instances a resilient element or spring requiring considerable pressure to "set" it holds the pin in locked condition.

By forming appropriate cutting edges 9' on the upper edges of the pawls 9, as shown for example in Fig. 8, the pin may be conveniently used for removing the burr on the inner face of a drilled opening. In this instance the pin is inserted in the opening, the pawls expanded and then the pin rotated, using the lever of the cam as a handle for turning it, thus serving to remove the pins or burrs on the inner edge of the holes. The sharpened edges do not interfere with the use of the device as a locking pin also.

While I have illustrated and described certain particular embodiments of my invention, it will be understood that changes and modifications may be made therein within the contemplation of my invention and under the scope of the following claims.

I claim:

1. A fastening pin or the like of the class described comprising a sleeve member having an opening through the wall thereof, a stem in the sleeve movable back and forth along the sleeve and having one end projecting beyond the sleeve to form an operating extension, a pawl on the stem having a terminal portion adjacent said opening and arranged to be projected through the opening and retracted within the opening by operation of the stem, spring means within the sleeve acting against the pawl for exerting a yieldable pressure against the pawl, and means on the sleeve spaced from the opening providing an abutment whereby work may be clamped between the abutment and the pawl when the pawl is in projected position.

2. A fastening pin or the like of the class described comprising a sleeve having an opening therein and a stem extending through one end thereof, a cam for reciprocating the stem, a pawl arranged to be projected through and retracted from projected position by operation of the cam, the sleeve having a flange thereon in spaced relation to the opening and the pawl, and spring means within the sleeve acting against the pawl through which yieldable pressure is exerted against the pawl in its projected position.

3. A fastening pin or the like of the class described comprising a sleeve having an opening therein and a stem extending through one end thereof, a cam for reciprocating the stem, a pawl arranged to be projected through and retracted from projected position by operation of the cam, the sleeve having a flange thereon in spaced relation to the opening and the pawl, the flange being adjustable along the sleeve, and spring means within the sleeve through which yieldable pressure is exerted against the pawl in projected position.

4. A fastening pin or the like of the class described comprising a sleeve having an opening therein and a stem extending through one end thereof, a cam for reciprocating the stem, and a pawl arranged to be projected through and retracted from projected position by operation of the cam, the sleeve having a flange thereon in spaced relation to the opening and the pawl, the flange being adjustable along the sleeve, the flange having spring fingers thereon.

5. A fastening pin or the like comprising a sleeve member, means on the sleeve providing a flange element to limit penetration of the pin into an opening, a stem slidably mounted in the sleeve, a plurality of pawls in the sleeve pivoted to the stem and having curved terminal portions, the sleeve having openings therein through which said terminal portions may be projected, an abutment in the sleeve bearing against the pawls, a spring in the sleeve urging the abutment against the pawls, and means at one end of the sleeve for moving the stem.

6. A fastening pin or the like comprising a sleeve member, means on the sleeve providing a flanged element to limit penetration of the pin into an opening, a stem slidably mounted in the sleeve, a plurality of pawls in the sleeve pivoted to the stem and having curved terminal portions, the sleeve having openings therein through which said terminal portions may be projected, an abutment in the sleeve bearing against the pawls, a spring in the sleeve urging the abutment against the pawls, and means at one end of the sleeve for moving the stem and holding it in position comprising an eccentric cam movable to an over-center position.

7. A fastening pin or the like comprising a sleeve member, means on the sleeve providing a flange element to limit penetration of the pin into an opening, a stem slidably mounted in the sleeve, a plurality of pawls in the sleeve pivoted to the stem and having curved terminal portions, the sleeve having openings therein through which said terminal portions may be projected, an abutment in the sleeve having a spherical surface bearing against the pawls, a spring in the sleeve urging the abutment against the pawls, and means at one end of the sleeve for moving the stem and holding it in position comprising an eccentric cam movable to an over-center position.

8. A fastening pin or the like comprising a sleeve member, means on the sleeve providing a flange element to limit penetration of the pin into an opening, a stem slidably mounted in the sleeve, a plurality of pawls in the sleeve pivoted to the stem and having curved terminal portions, the sleeve having openings therein through which said terminal portions may be projected, an abutment in the sleeve having a spherical surface bearing against the pawls, a spring in the sleeve urging the abutment against the pawls, and means at one end of the sleeve for moving the stem and holding it in position comprising an eccentric cam movable to an over-center position, said flange element being adjustable longitudinally of the sleeve.

9. A fastening pin or the like comprising a sleeve member closed at one end, a stem slidably mounted in the sleeve having an end projecting through the closed end of the sleeve, an eccentric cam on the projecting end for reciprocating the stem, a pair of upwardly diverging pawls pivoted on the stem inside the sleeve and having outwardly curved end portions movable through openings in the sleeve, a collar inside the sleeve bearing against the curve portions of the pawls, a compression spring in the sleeve confined between the collar and the closed end of the sleeve, and an abutment element on the outside of the sleeve spaced above the upper ends of the pawls.

10. A fastening pin or the like comprising a sleeve member closed at one end, a stem slidably mounted in the sleeve having an end projecting through the closed end of the sleeve, an eccentric cam on the projecting end for reciprocating the stem, a pair of upwardly diverging pawls pivoted on the stem inside the sleeve and having outwardly curved end portions movable through openings in the sleeve, a collar inside the sleeve bearing against the curved portions of the pawls, a compression spring in the sleeve confined between the collar and the closed end of the sleeve, and an abutment element on the outside of the sleeve spaced above the upper ends of the pawls, said pawls having laterally turned lugs on the lowermost ends thereof to limit the opening movement of the pawls.

11. A pin structure as recited in claim 5 in which the pawl elements have sharpened edges.

12. A pin structure as defined in claim 10 in which the curved outer edges of the pawls are sharpened.

JOSEPH C. LANG.